US009780878B2

(12) United States Patent
Sackman et al.

(10) Patent No.: US 9,780,878 B2
(45) Date of Patent: Oct. 3, 2017

(54) BANDWIDTH OPTIMIZATION AND HITLESS TRANSPORT IN DYNAMIC FREE SPACE OPTICAL COMMUNICATIONS NETWORKS

(71) Applicant: The Boeing Company, Chicago, IL (US)

(72) Inventors: Ronald Ward Sackman, Mountain View, CA (US); Scott Charles Sullivan, Pasadena, CA (US); John Meier, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 14/656,099

(22) Filed: Mar. 12, 2015

(65) Prior Publication Data

US 2015/0270897 A1 Sep. 24, 2015
US 2016/0233958 A9 Aug. 11, 2016

Related U.S. Application Data

(60) Provisional application No. 61/968,471, filed on Mar. 21, 2014.

(51) Int. Cl.
    *H04B 10/00* (2013.01)
    *H04B 10/118* (2013.01)
(52) U.S. Cl.
    CPC ................. *H04B 10/118* (2013.01)
(58) Field of Classification Search
    CPC ... H04B 10/118; H04B 10/11; H04B 10/1123; H04B 10/2503; H04B 10/299;
    (Continued)

(56) References Cited

U.S. PATENT DOCUMENTS 7,215,887 B2 * 5/2007 Ternullo ............... G06F 11/10
                                                       398/118
7,561,802 B2 * 7/2009 Krill ................... H04B 10/118
                                                       398/121

(Continued)

OTHER PUBLICATIONS

Wikipedia, "Optical add-drop multiplexer," downloaded from <http://en.wikipedia.org/wiki/Optical_add-drop_multiplexer> on Mar. 12, 2015, 2 pages.

(Continued)

*Primary Examiner* — Hibret Woldekidan
(74) *Attorney, Agent, or Firm* — Charles L. Moore; Moore & Van Allen PLLC

(57) ABSTRACT

A system for optical communications may include a multiplicity of optical communications relay platforms that each move above a surface of the earth. Each relay platform may include a relay link for communications between adjacent relay platforms. The system may also include a plurality of ground stations. Each ground station may be configured to communicate with another of the ground stations through at least one of the relay platforms. Each ground station may include an optical communications link for optical communications with successive relay platforms. The optical link of each ground station may be configured for handover connections between the successive relay platforms as the relay platforms move relative to the earth. The system may additionally include a network operations center having a link controller. The link controller may be configured to control switching of the communications links for hitless transmission between the ground stations.

20 Claims, 9 Drawing Sheets

(58) Field of Classification Search
CPC ... H04L 49/254; H04J 14/0283; H04J 14/021; H04J 14/0201
USPC ............... 398/125, 121, 124, 118, 79, 83
See application file for complete search history.

(56) References Cited

U.S. PATENT DOCUMENTS

| | | | | |
|---|---|---|---|---|
| 9,479,284 B2* | 10/2016 | Kaneko | ............... | H04B 10/272 |
| 2003/0214398 A1* | 11/2003 | te Boekhorst | ......... | G08B 25/10 |
| | | | | 340/531 |
| 2007/0072603 A1* | 3/2007 | Wang | ................ | H04B 7/18513 |
| | | | | 455/427 |
| 2008/0130726 A1* | 6/2008 | Sofer | ................... | H04W 28/22 |
| | | | | 375/220 |
| 2011/0274429 A1* | 11/2011 | Caplan | ............... | H04B 10/5561 |
| | | | | 398/65 |
| 2013/0322883 A1* | 12/2013 | Dahlfort | ............. | H04J 14/0209 |
| | | | | 398/84 |
| 2017/0111138 A1* | 4/2017 | Muth | ................ | H04J 14/0221 |

OTHER PUBLICATIONS

Wikipedia; "Wavelength-division multiplexing," downloaded from <http://en.wikipedia.org/wiki/Wavelength-division_multiplexing> on Mar. 12, 2015, 10 pages.

\* cited by examiner

BANDWIDTH OPTIMIZATION AND HITLESS TRANSPORT IN DYNAMIC FREE SPACE OPTICAL COMMUNICATIONS NETWORKS

CROSS-REFERENCE TO RELATED APPLICATIONS

This application claims the benefit of U.S. Provisional Application No. 61/968,471, filed Mar. 21, 2014.

FIELD

The present disclosure relates to wireless communications, and the like, and more particularly to a system and method for bandwidth optimization and hitless transport in dynamic free space optical communication networks.

BACKGROUND

Optical communications channels or links in optical communications networks may use wavelength division multiplexing (WDM) lambdas or lambda circuits for carrying multiple two-way communications simultaneously. Traditionally, WDM lambdas have defined discrete speeds such as 2.5, 10, 40 and 100 gigabits per second (Gbps). The use of these discrete values is due to technology standards and legacy Synchronous Optical Networks (SONET). Accordingly, there is a need to provide an optical network capable of variable speed lambdas, i.e. lambdas that can be tuned to arbitrary speeds such as 3, 11, 42, and 103 Gbps, and a solution to control and optimize these variable speed lambdas.

Additionally, free space optical communications (FSOC) links, that may be used with optical communications networks or may be part of an optical communications network, are subject to degradation or loss of communications by weather conditions or other events. This can be particularly challenging in systems such as medium/low earth satellites and unmanned aerial vehicles where the optical link platforms move with respect to the surface of the earth. Accordingly there is also a need to provide a solution for hitless communications in an FSOC environment, i.e., bit or packet loss in the FSOC environment does not perceptibly impact end user performance

SUMMARY

In accordance with an embodiment, a system for optical communications may include a multiplicity of optical communications relay platforms that each move relative to earth and above a surface of the earth. Each optical communications relay platform may include a relay link for communications between adjacent optical communications relay platforms. The system may also include a plurality of ground stations at different locations on the surface of the earth. Each ground station may be configured to communicate with another of the ground stations through at least one of the multiplicity of optical communications relay platforms. Each ground station may include an optical communications link for optical communications with successive optical communications relay platforms. The optical communications link of each ground station may be configured for handover connections between the successive optical communications relay platforms as the optical communications relay platforms move relative to the earth. The system may further include a network operations center that includes a link controller. The link controller may be configured to control switching of the optical communications links and relay links for hitless transmission of communication during handover between optical communications relay platforms and ground station link changes.

In accordance with another embodiment, a system for optical communications may include a variable speed lambda network. The variable speed lambda network may include a provider optical add-drop multiplexer (ADM) and a customer optical ADM. The system may also include a plurality of variable speed wavelength division multiplexing (WDM) lambdas. The variable speed WDM lambdas provide optical communications between the provider optical ADM and the customer optical ADM. The system may also include a link controller. The link controller may be configured to control functions which may include admission of a variable speed WDM lambda to the variable speed lambda network; modification of a speed of a particular variable speed WDM lambda; and optimization of bandwidth of the variable speed WDM lambdas.

In accordance with an additional embodiment, a method for admission control and bandwidth optimization in a variable speed lambda network may include receiving, by a processor, a new request from a customer. The new request may include one of a request for a new variable speed WDM lambda or a speed change request for an existing variable speed WDM lambda. The method may also include retrieving, by the processor, an active topology map of the variable speed lambda network from a database and executing a multi-commodity network flow optimization based on the active topology map of the variable speed lambda network. The method may additionally include configuring, by the processor, network elements to support the new request in response to the new request being admitted based on the multi-commodity network flow optimization. The network elements may include a provider optical ADM, a customer optical ADM and the plurality of variable WDM lambdas which provide an optical communication link between the provider optical ADM and the customer optical ADM. The method may additionally include updating, by the processor, bandwidth parameters of a link of the network topology graph associated with the customer. The method may further include notifying, by the processor, the customer that the new request has been granted and provisioned.

In accordance with a further embodiment, a method for dynamically changing free space optical communication links for hitless transmission may include polling a ground station for a change in quality of an optical communications link from the ground station to an optical communications relay platform. The method may also include transmitting a link quality change notification from a ground station to a database in response to the change in quality of the optical communications link. The method may also include polling at least one external sensor associated with the ground station for an environmental change and transmitting an environmental change notification from the at least one external sensor to the database in response to the environmental change. The method may additionally include generating a threshold notification in response to at least one of the change in quality of the optical communications link exceeding a link quality threshold and the environmental change exceeding an environmental change threshold. The method may also include transmitting the threshold notification to the database. The method may further include switching at least one of the optical communications link and a relay link between the optical communications relay platform and a successive optical communications relay platform in response to at least one of the change in quality of the communications link, the environmental change and the threshold notification.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
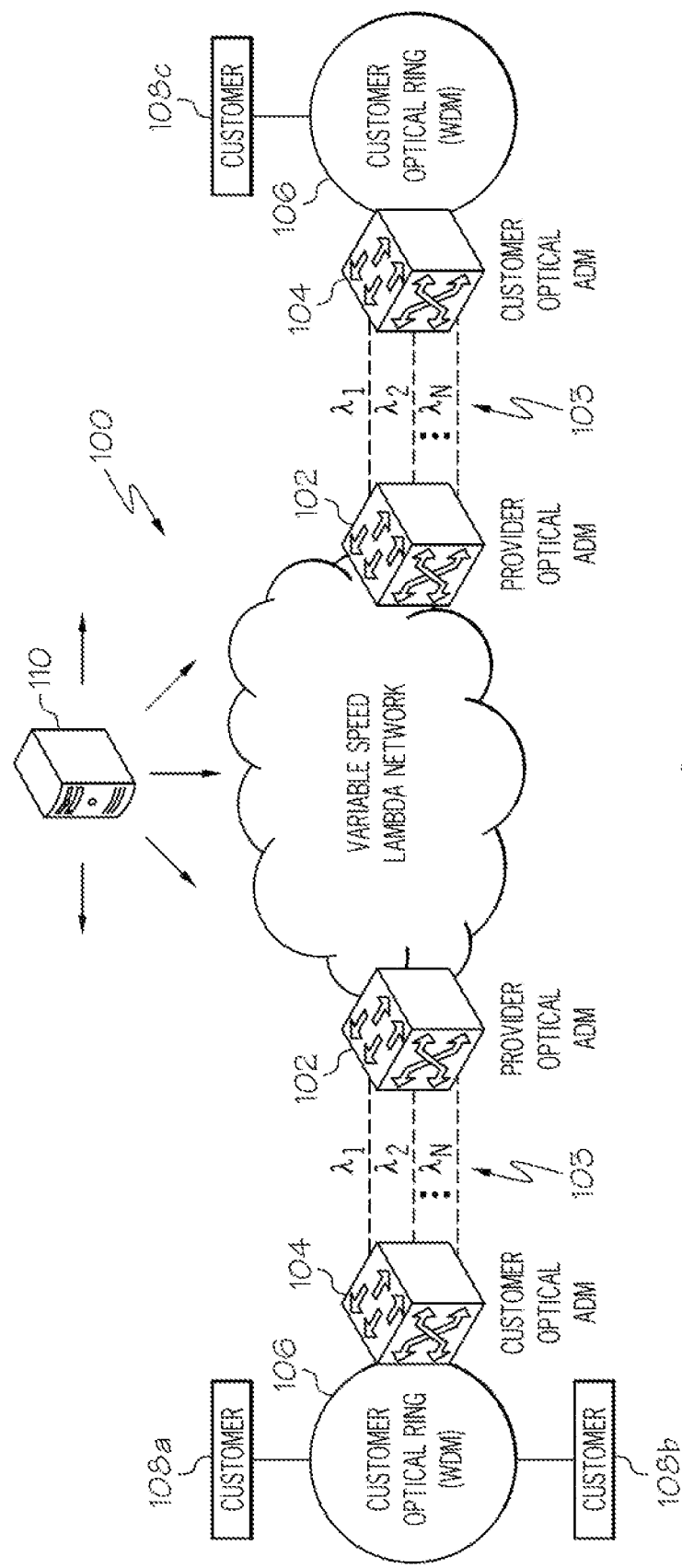
FIG. 1 is a block schematic diagram of an example of a variable speed lambda network in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a block schematic diagram of an example of a variable speed lambda network 100 in accordance with an embodiment of the present disclosure. The variable speed lambda network 100 may include one or more provider optical add-drop multiplexers (ADM) 102 and one or more customer optical ADMs 104. A plurality of variable speed wavelength division multiplexing (WDM) lambdas 103 may provide optical communications between each of the provider optical ADMs 102 and the customer optical ADMs 104. A customer optical ring 106 may be coupled to each customer optical ADM 104. End users or customers 108a-108c may be coupled to the variable speed lambda network 100 by the customer optical ring 106.

A link controller 110 or other device may be provided and may be configured to perform bandwidth optimization and admission control within the variable speed lambda network 100 or system. Accordingly, the variable speed lambda network 100 may be configured to allow a customer 108 to purchase and utilize lambda bandwidth on a "pay as you grow" basis. For example, the customer 108a may initially start with $\lambda_1$ which may run at 10 Gbps. After a period of time, the customer 108a may decide to increase bandwidth to 13 Gbps to support traffic growth in his own network. The customer 108a would initially connect to the variable speed lambda network 100 using equipment capable of supporting the upper bound of his desired or anticipated speed range (e.g. 40 Gbps or 100 Gbps). However, the customer 108a would pay for only the speed that he is currently using (e.g. 13 Gbps). The speed would be controlled or throttled in the variable speed lambda network 100 by the link controller 110. The link controller 110 may be a processor or other computer device configured to perform the functions and operations described herein.

Figure 2:
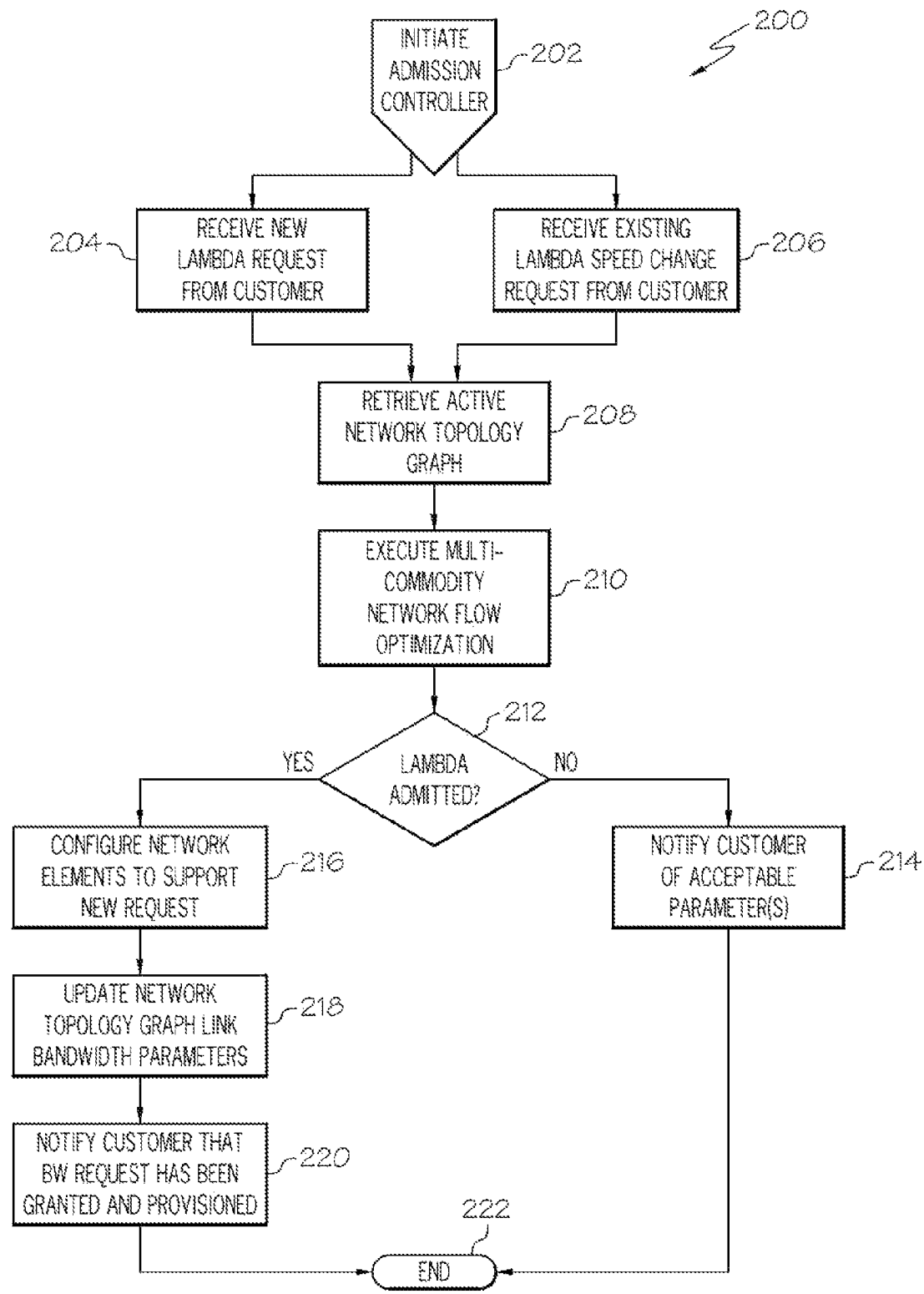
FIG. 2 is an example of a method for admission control and bandwidth optimization in a variable speed lambda network in accordance with an embodiment of the present disclosure.

Referring also to FIG. 2, FIG. 2 is an example of a method 200 for admission control and bandwidth optimization in a variable speed lambda network in accordance with an embodiment of the present disclosure. The method 200 may be embodied in and performed by the link controller 110 in FIG. 1. In block 202, the link controller, which may also be referred to as an admission controller, may be initiated in response to receiving a new request from a customer. The new request may either be a request for a new lambda or a request for a change in speed of an existing lambda. In block 204, the new request that is received is a request from the customer for admission of a new lambda to the variable speed WDM lambda network. Alternatively, in block 206, the new request is a speed change request or speed modification request for an existing variable speed WDM lambda.

In block 208, an active topology map of the variable speed lambda network may be retrieved from a database associated with the link controller 110 or network 100. The active topology map of the variable speed lambda network may include a representation of each of the current variable speed lambdas that form the network, the lambda speed or link bandwidth parameter (gigabits per second) associated with each lambda and any other parameters associated with each lambda for admission control of new lambdas and bandwidth optimization of the variable speed lambdas in the network as described herein. The active topology map of the variable speed lambda network may be similar to the exemplary variable speed lambda network illustrated in FIG. 1.

In block 210, a multi-commodity network flow optimization based on the active topology map of the variable speed lambda network may be executed. Network flow models, such as multi-commodity network flow optimization and constraint based routing algorithms, are used for traffic engineering of communications networks and can assist in determining routing decisions. Multi-commodity network flow optimization considers multiple demand pairs with positive demand volumes (i.e. user traffic) and supports a series of objective functions to achieve different goals (e.g. minimum cost routing, average delay, etc.). As demand volumes dynamically change (e.g. new service requests, re-route due to weather, etc.), inputs and network constraints are modified to determine routing decisions to achieve the desired goal.

The multi-commodity network flow optimization may use one of several constraint-based optimization formulations. Examples of constraint-based optimization formulation or techniques that may be used may include but is not necessarily limited to shortest path-based routing flow (see below for formula) which is a minimum cost routing case; average delay optimization which minimizes average packet delay; link utilization optimization which minimizes link utilization; Equivalent capacity (see below for formula) which increases network resource utilization while sustaining an acceptable quality of service.

An example of a formulation for minimum cost routing with non-splittable multi-commodity flow is as follows:

$$\text{minimize}_{\{u\}} F = \sum_{k=1}^{K} \sum_{p=1}^{P_k} \xi_{kp} h_k u_{kp}$$

$$\text{subject to } \sum_{p=1}^{P_k} u_{kp} = 1, k = 1, 2, \ldots, K$$

$$\sum_{k=1}^{K} \sum_{p=1}^{P_k} \delta_{kpl} h_k u_{kp} \leq c_l, l = 1, 2, \ldots, L$$

$$u_{kp} = 0 \text{ or } 1, p = 1, 2 \ldots, p_k$$

$$k = 1, 2 \ldots, K$$

Where K is the number of demand pairs with positive demand volume; L is the number of links; $h_k$ is the demand volume of demand identifier k=1, 2, . . . , K; $c_l$ is the capacity of link t=1, 2, . . . , L; $P_k$ is the number of candidate paths for demand k, k=1, 2, . . . , K; $\delta_{kpl}$ is the link path indicator which is set to 1 if path p for demand pair k uses the link 1, 0 otherwise; $\epsilon_{kp}$ is the nonnegative unit cost of flow on path p for demand k; and $u_{kp}$ is the binary decision to choose a path, where p=path and k=demand pair.

An example of an equivalent capacity algorithm may include an admission controller algorithm and customer demand calculation to reserve bandwidth to keep the loss bounded by a specified probability such that loss occurs when the number of active sources, k, transmitting at R bps is such that k*R>C, where C is the allocated capacity. This example assumes an ON/OFF traffic model. For N customers, the probability that k customers are active is given by a binomial distribution, where $P_{on}$ is the probability the customer is active:

$$\text{Binominal Distribution} = P(X = k) = \binom{N}{k} P_{on}^{k} (1 - P_{on})^{N-k}$$

For peak bandwidth allocation, k*R bps would be required to support k customers. Loss would occur if k+1 customers were transmitting and k*R bps capacity is available. Peak bandwidth allocation clearly does not take advantage of statistical multiplexing by exploiting the OFF period of a customer. Quality of Service (QoS) can be defined in terms of the probability of exceeding the available capacity, which must be less than some defined $P_{loss}$ value as follows:

QoS Probability=$P(k*R>C)<P_{loss}$ or $P_{loss}=Pr(X>k)$

In other words, the probability of k*R being greater than the allocated capacity must be less than some defined $P_{loss}$ value, which is the same as saying $P_{loss}$ is equal to the probability of k+1 active customers.

Referring back to FIG. 2, in block 212, a determination may be made whether the new variable speed lambda is to be admitted or the speed of the existing lambda changed based on the multi-commodity network flow optimization. For example, the new lambda may not be admitted or granted if there is no capacity for another lambda or the requested speed is unavailable for some reason.

If the new variable speed lambda is not admitted or the speed change is not permitted, the method 200 may advance to block 214. In block 214, the customer may be notified that the new lambda request or speed change request was not admitted or granted. The customer may also be notified of the reason for the request not being granted. The customer may also be notified of acceptable parameters in the event the customer may want to reapply. For example, the customer may have requested a speed increase from 10 Gbps to 20 Gbps; however, the variable speed lambda network may only be able to support an increase to 13 Gbps.

If the request for the new variable speed lambda or speed change is admitted or granted in block 212, the method 200 may advance to block 216. In block 216, network elements to support the request for the new variable speed WDM lambda or lambda speed change may be configured based on the multi-commodity network flow optimization. The network elements may include the provider optical ADM 102 in FIG. 1, customer optical ADM 104, the variable WDM lambda circuit 103 of the customer and any components of these elements that may need to be configured for the new WDM lambda or increase in lambda speed.

In block 218, the link bandwidth parameter associated with the lambda of the customer may be updated in the network topology graph. In block 220, the customer may be notified that the new request has been granted and provisioned. The method 200 may end at termination 222.

Figure 3:
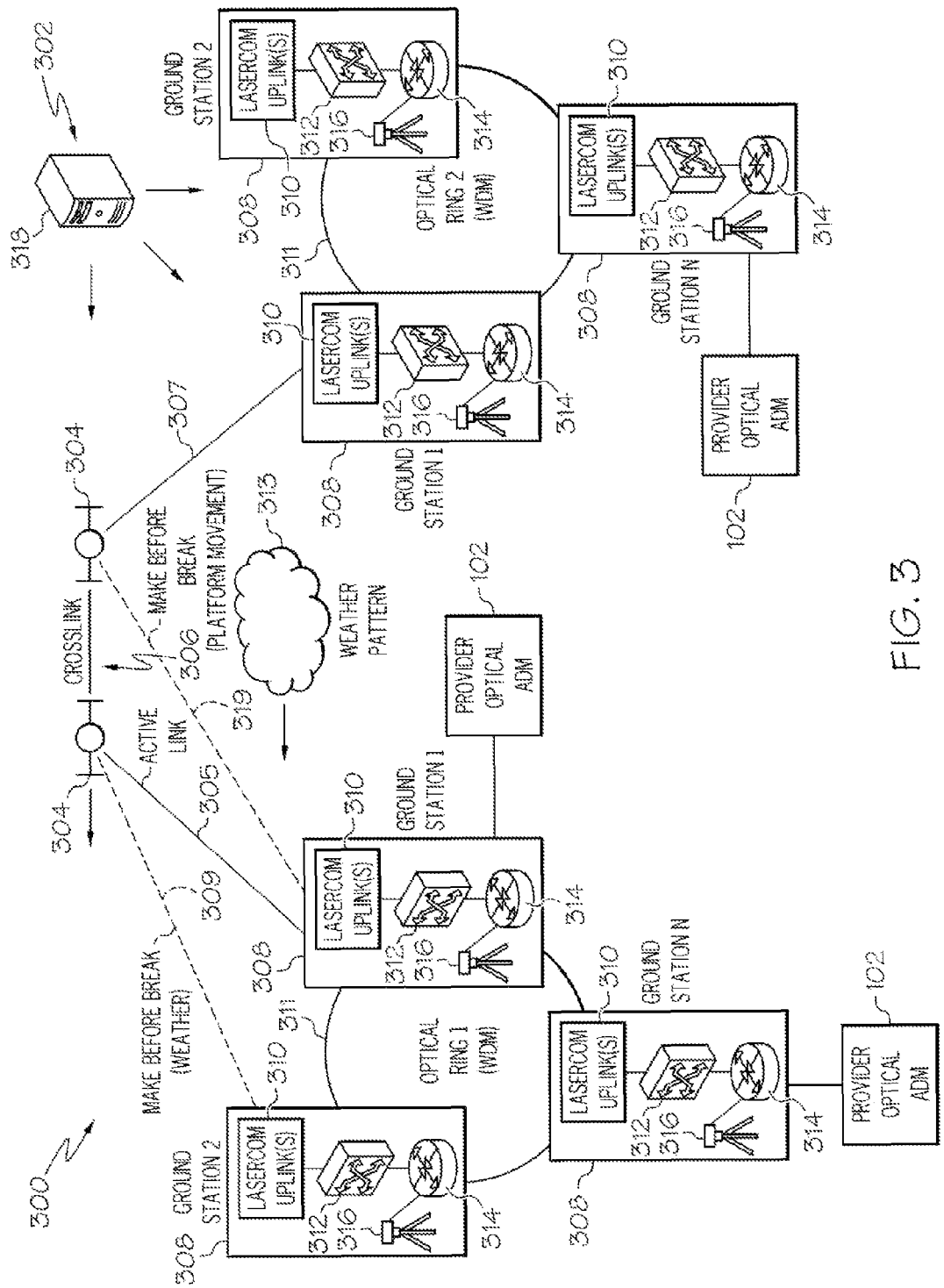
FIG. 3 is a block schematic diagram of an example of a free space optical communications network including a system for hitless transmission in accordance with an embodiment of the present disclosure.

FIG. 3 is a block schematic diagram of an example of a free space optical communications network 300 including a system 302 for hitless transmission in accordance with an embodiment of the present disclosure. The network 300 may include a multiplicity of optical communications relay platforms 304 that each move relative to earth and above a surface of the earth. Each optical communications relay platform 304 may include a relay link 306 or cross-link for communications between adjacent optical communications relay platforms 304.

The network 300 may also include a plurality of ground stations 308 at different locations on the surface of the earth. Each ground station 308 may be configured to communicate with another of the ground stations 308 through at least one of the multiplicity of optical communications relay platforms 304 or simply relay platforms 304. Each ground station 308 may include an optical communications link 310 or links for optical communications with the relay platforms 304. The optical communications link 310 may be established by a laser communications device in the ground station 308. The optical communications link 310 may also be referred to as a lasercom link, lasercom uplink or lasercom up/down link. The optical communications link 310 of each ground station 308 may be configured for handover connections between successive optical communications relay platforms 304 as the relay platforms 304 move relative to the earth and come into view of the ground station 308 above the horizon of the earth. One or more provider optical ADMs 102 may be coupled to each ground station 308.

The ground stations 308 may be configured to form an optical ring 311 or optical rings. The ground stations 308 that form the optical ring 311 may communicate with one another via the optical ring 311. Communications between the ground stations 308 within an optical ring may utilize WDM. Two optical rings 311 running WDM are shown in the exemplary optical communications network 300 in FIG. 3.

Each ground station 308 may be capable of establishing optical communication links or lasercom uplinks 310 to one or more the optical communications relay platforms 304 which may be lasercom relay platforms moving relative to the earth. The optical communications relay platforms 304 may be airborne, for example unmanned aerial vehicles (UAVs) or space borne, for example low earth orbit (LEO) satellite or medium earth orbit (MEO) satellites. In an exemplary embodiment were the optical communications relay platforms 304 are LEO or MEO satellites, each ground station 308 may include an optical switch 312 such as a reconfigurable optical add drop multiplexer (ROADM), a router 314, one or more external sensors 316, such as all sky weather cameras, and lasercom uplink equipment 310. Multiple lasercom uplinks 310 may reside at each ground station 308 to facilitate make-before-break optical communication connections for handover. An individual ground station 308 is capable of making a connection with a next or successive optical communications relay platform 304 in the orbiting constellation of relay platforms 304 as the next or new relay platform 304 comes over the horizon and into view of the ground station 308. The connection to a previous relay platform 304 is maintained with the moving relay constellation and is subsequently broken after the new optical communications connection to the next or successive optical communication relay platform 308.

Lasercom links 310 are sensitive to weather patterns. If a weather pattern interferes with transmission from one ground node or ground station 308, the system 302 is capable of making a connection from a different ground station 308 at a physically diverse location. The lasercom uplink 310 from the previous ground station 308 may be broken after the new lasercom uplink connection from the different ground station 308 to the relay platform 304 is made. The solid lines, uplink link 305, cross-link 306 and uplink 307 represent an active optical communication links in FIG. 3. Broken or dashed lines, uplink 309 and uplink 319 represent a make-before-break communications link. The switch in communications links may be because of a weather pattern 313 or other degradation or obstruction of the optical transmission path.

All link changes are coordinated by a link controller 318. The link controller 318 may be configured to control switching or changes of the optical communications links or lasercom uplinks 310 and relay links or cross-links 306 for hitless transmission of communication signals as described herein. The link controller 318 and forming the make-befire break optical communication links may define the system 302 for hitless optical communications as described herein. The link controller 318 may be running at an operations center 402, with out-of-band connectivity to all devices in the network 300 as shown in FIG. 4.

Figure 4:
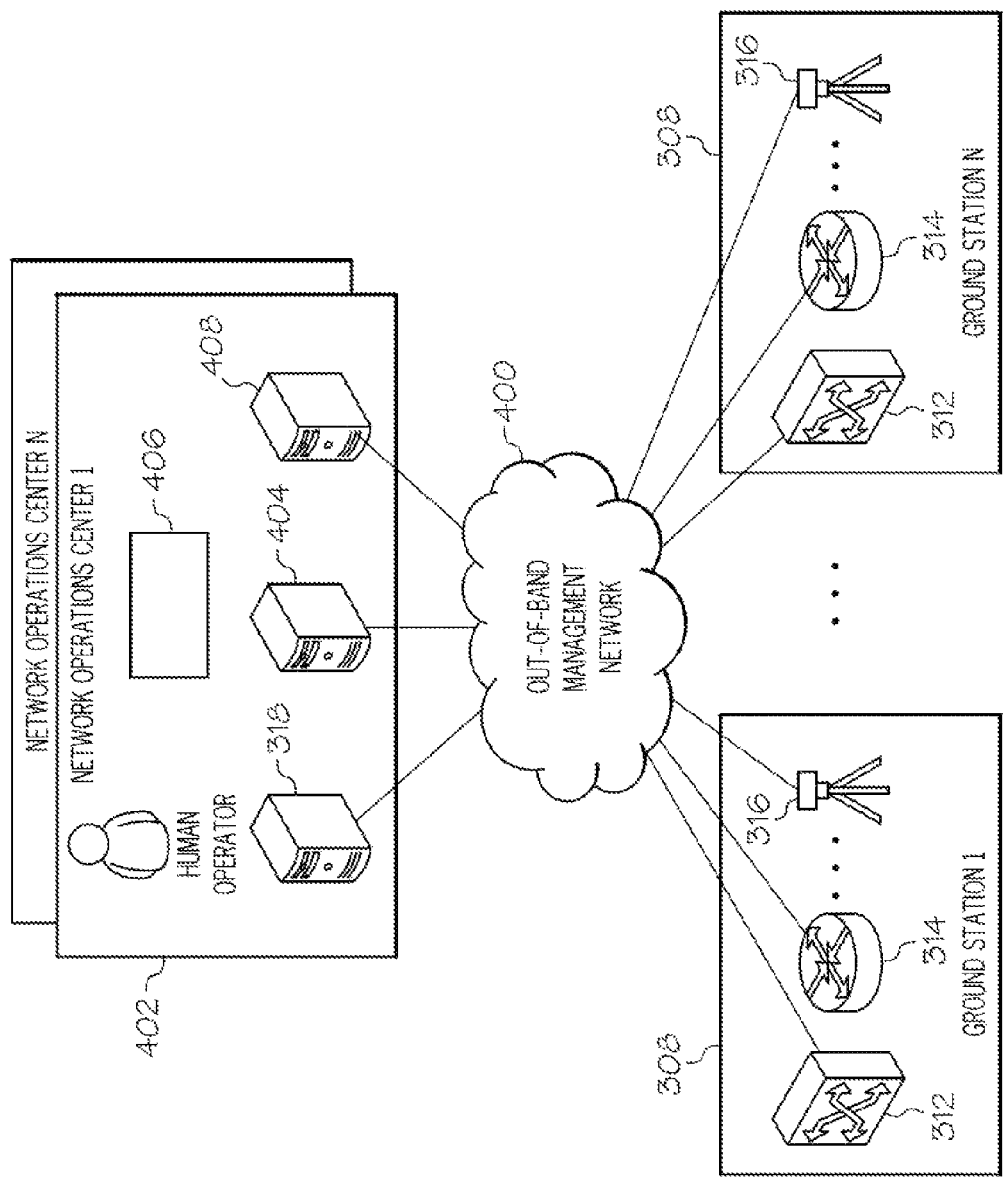
FIG. 4 is a block schematic diagram of an example of an out-of-band management network that may be associated with the free space optical communications network of FIG. 3 in accordance with an embodiment of the present disclosure.

FIG. 4 is a block schematic diagram of an example of an out-of-band management network 400 that may be associated with the free space optical communications network 300 of FIG. 3 in accordance with an embodiment of the present disclosure. Ground stations 308 may be accessible to the operations center 402 via the out-of-band network 400 that is separate from the network that carries end user or customer communications traffic. The operations center 402 may include the link controller 318, a network event database 404, a correlation engine 406, and a network performance management system 408. Operation of these components and other components of the system 300 in coordination with one another for hitless communications will be described in more detail with reference to FIGS. 6A-6C.

The link controller 318 may be for example a software defined networking platform such as Floodlight controller operating on a processor or computing device. Floodlight is open source software for building software-defined networks. Floodlight is a trademark of Big Switch Networks. Inc. in the United States other countries or both.

The event database 404 may be a commercial platform such as IBM Tivoli Omnibus or similar database. The correlation engine 406 may be a commercial platform such as IBM Impact or other system. The performance manager 408 may be a commercial platform such as IBM Tivoli Network Performance Manager or the like. The operations center may be instantiated at a single site, or at multiple sites. IBM, Tivoli Omnibus, IBM Impact and Tivoli Network Performance Manager are trademarks of International Business Machines Corporation in the Unites States, other countries or both.

Figure 5:
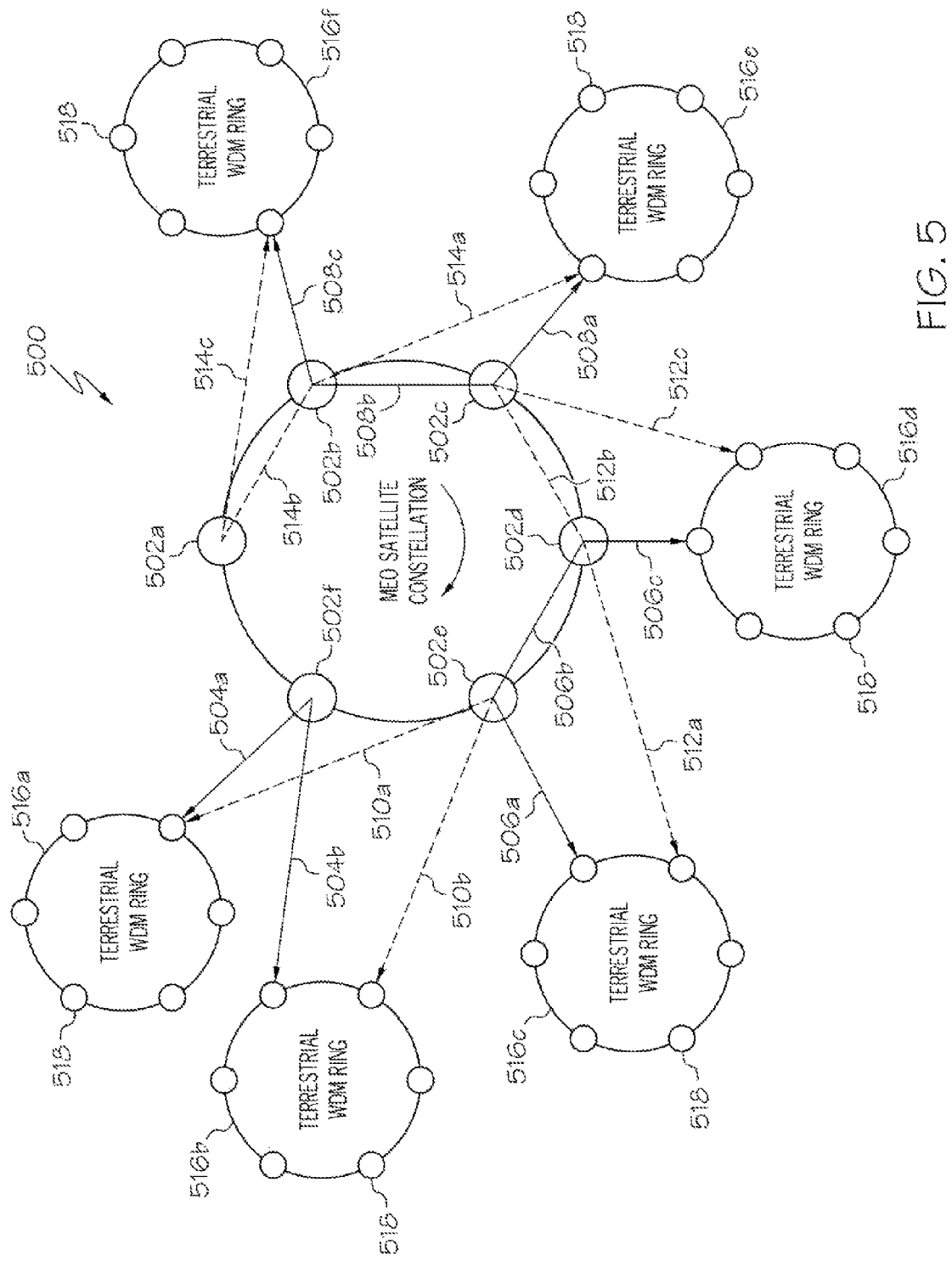
FIG. 5 is an example of an implementation for hitless transmission over a free space optical communications network or system in accordance with an embodiment of the present disclosure.

FIG. 5 is an example of an implementation for hitless transmission over a free space optical communications network or system 500 in accordance with an embodiment of the present disclosure. The network or system 500 may be the same as the network 300 and system 302 in FIG. 3. The exemplary network or system 500 includes a constellation consisting of six MEO satellites 502a-502f moving with respect to the earth's surface. The satellites 502a-502f provide lasercom links 504-514 to connect terrestrial WDM rings 516a-516f. Each ring 516a-516f may include a plurality of ground stations 518. The solid lines 504a-504b, 506a-506c and 508a-508c represent currently active optical links or connections. The dashed or broken lines 510a-510b, 512a-512c and 514a-514c represent make-before-break optical links or handover connections. The connection between rings 516a and 516b is serviced by a single satellite 502f. For example, this might be a link connecting physically diverse rings in a single continent such as Australia. The connections between rings 516c-516d and rings 516e-516f span multiple satellites 502, traversing satellite cross links 506b and 508b. The handover links 510a-510b, 512a-512c and 514a-514c may be established to the same ground stations 518 as their preceding links 504a-504b, 506a-506c and 508a-508c, respectively, as in the case of the connection between rings 516e and 516f. Alternatively the handover links may be established using different ground stations than their preceding links, as shown for the connections between rings 516a and 516b and rings 516c and 516d. Handover links may connect to different ground stations than their preceding links in response to weather patterns or other changing conditions.

Figure 6A:
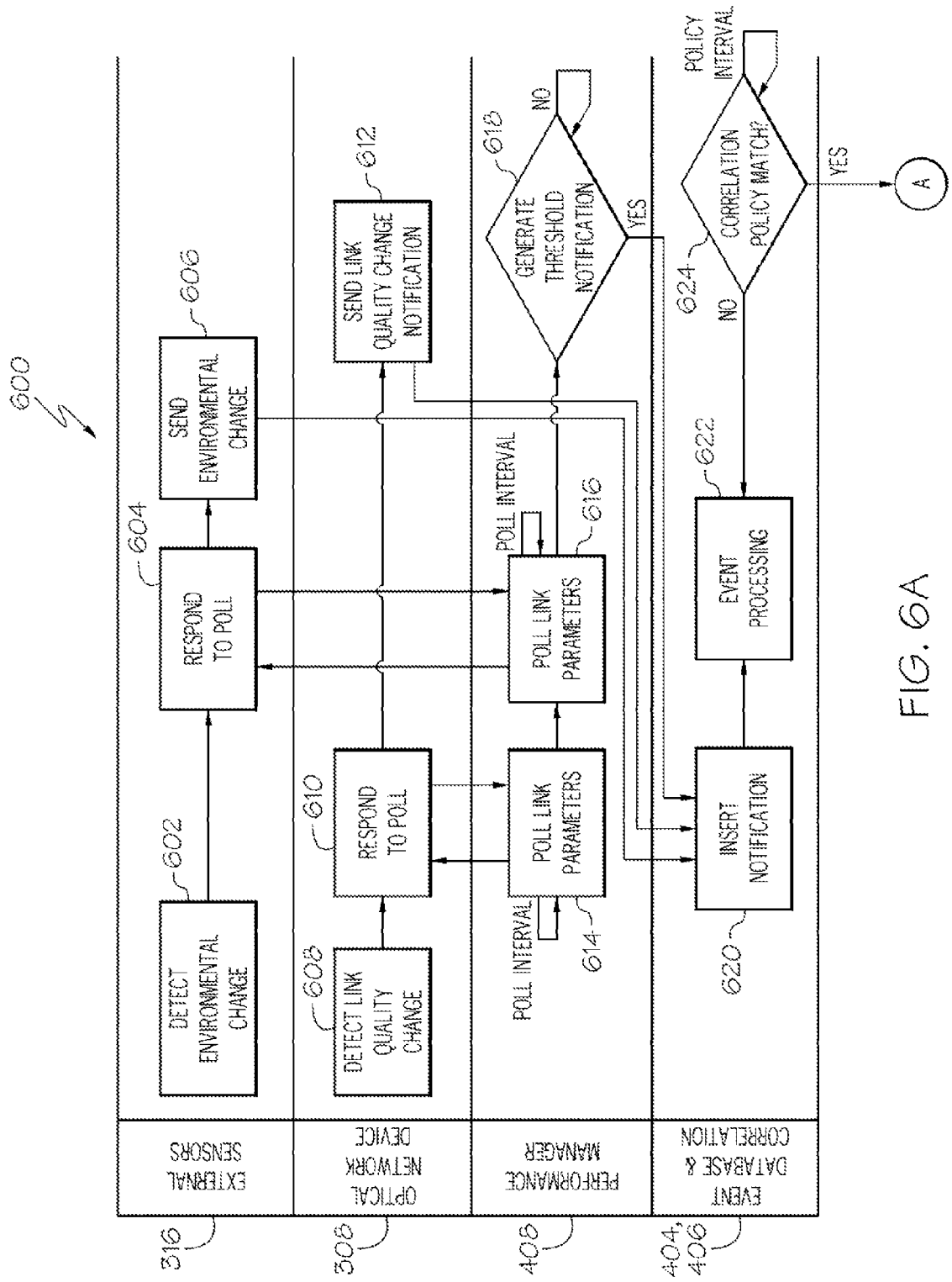
FIGS. 6A-6C (collectively FIG. 6) are an example of a method of operation for hitless transmission of the free space optical communications network of FIG. 3 in accordance with an embodiment of the present disclosure.
Figure 6B:
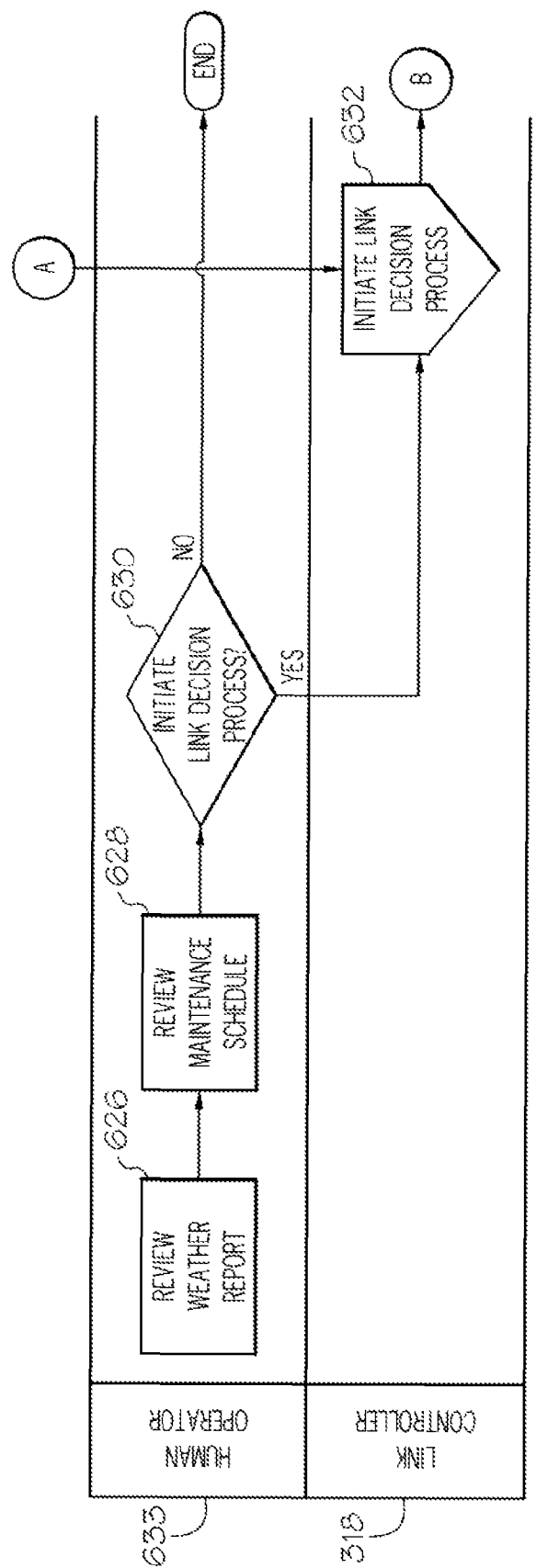
Figure 6C:
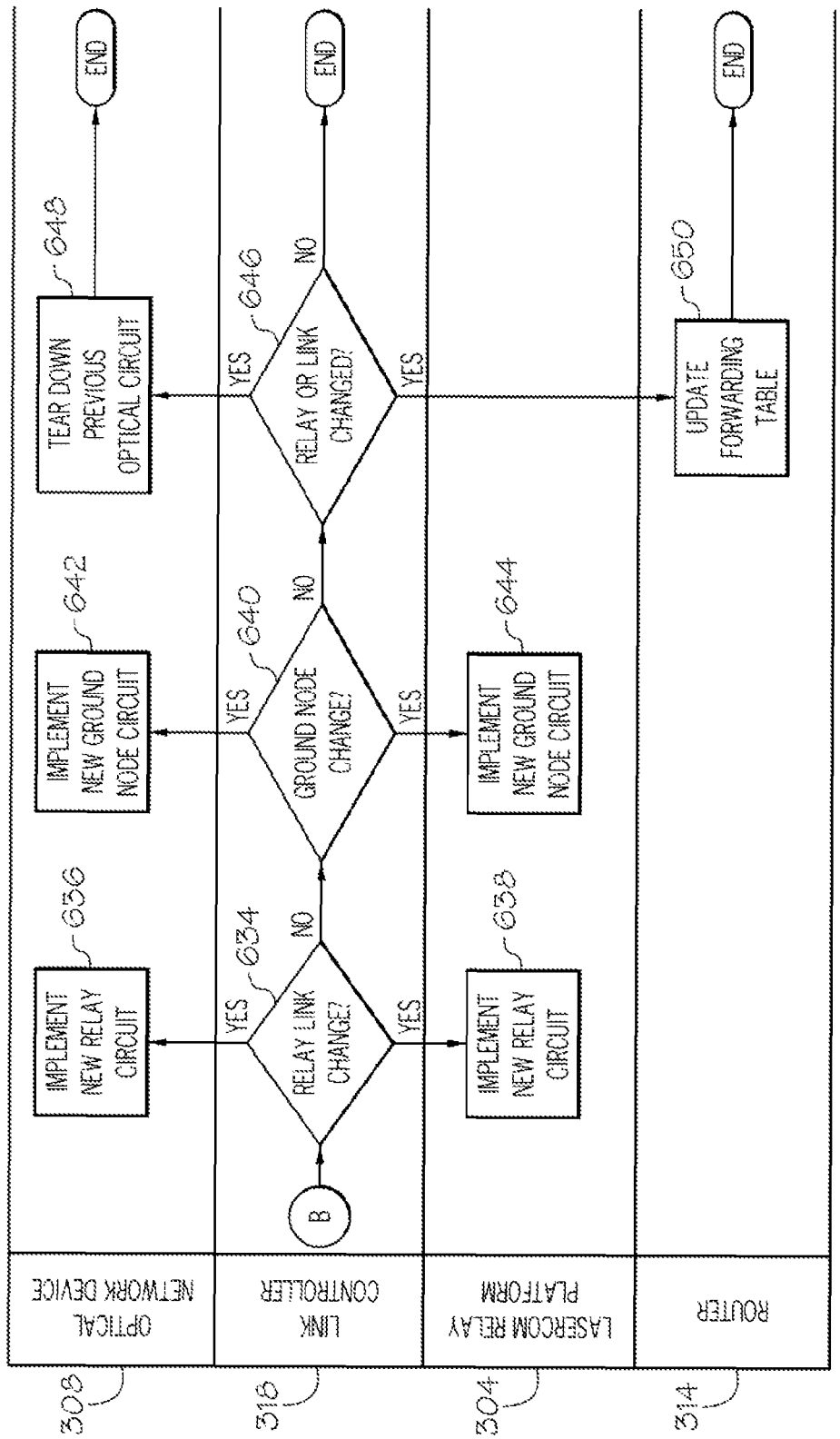

FIGS. 6A-6C (collectively FIG. 6) are an example of a method 600 of operation for hitless transmission of a free space optical communications network in accordance with an embodiment of the present disclosure. The exemplary method 600 may be performed by components or elements of the network 300 and system 302 in FIG. 3 and components or elements of the network operations center 402 in FIG. 4. The method 600 is explained as being performed by the components of the network 300 and system 302 and network operations center 402, although the invention is not intended to be limited by the particular exemplary architecture described and other configurations may be possible in carrying out the functions and operations described. The method 600 depicted in FIGS. 6A-6C is divided into functions and operations that may be performed by the different components or elements of the network 300 and system 302. Accordingly, FIGS. 6A-6C illustrate functions and operations that may be performed by external sensors 316 in FIG. 3, optical network devices, such as components of the ground stations 308, the performance manger 408, the event database 404 and correlation engine 406 in FIG. 4, a human operator in FIG. 4, the link controller 318, lasercom relay platform 304 and router 314 in FIG. 3.

In block 602, an external sensor 316, such as an all sky camera, may detect optical link-impacting weather conditions. In block 606, a notification may be sent by the external sensor 316 to the event database 404. In block 620, the notification may be inserted or stored in the database 404.

In block 608, an optical network device, such as ground station 308, may detect degradation, such as reduced signal-to-noise ratio or increased bit error rate, on a lasercom uplink 310 associated with the optical network device 308. In block 612, a link quality change notification may be sent to the event database 404 by the optical network device 308 in response to detecting the change in the quality of the lasercom link that exceeds a predetermined threshold value. The link quality change may be inserted or stored in the event database 404 in block 620.

In blocks 614 and 616, the performance manger 408 may poll system parameters at regular intervals to detect whether key performance indicators of interest such as bit error rate, packet loss, jitter, received signal strength, and/or latency may have exceeded a threshold value. A threshold violation may be sent to the event database 404 in response to detection of a performance indicator exceeding a threshold value in block 618. Accordingly, in block 614, the performance manager 408 may poll the optical network device 308 at regular intervals for operating parameters and in block 610 a response to the poll may be returned to the performance manager 408.

In block 616, the performance manager 408 may poll external sensors 316 at regular intervals to detect any changes in weather conditions. In block 604, the external sensors 316 may respond to the poll.

In block 618, a determination may be made if any of the parameters, such as those listed above, from the polling have exceeded a predetermined threshold value. A threshold notification may be generated and sent to the event database 404 in response to a parameter exceeding its threshold value.

In block 622, event processing may analyze the environmental change information received from the external sensors 316, link quality change parameters or information from the optical network device 308 and threshold notification information from the performance manager 408.

In block 624, the correlation engine may determine if there are any correlation policy matches based on the parameters and information processed in block 622. The method 600 may advance to block 632 (FIG. 6B) in response to any correlation matches indicating a change in link conditions, weather conditions or other changes that may warrant a switch or change in optical communications links, ground stations or relay platforms. In block 632, a link decision process may be initiated by the link controller 318. An example of a method of operation of a link controller to determine link changes for hitless communications will be described with reference to FIG. 7.

In FIG. 6B, a human operator 633 may also initiate the link decision process 630 in response to external data such as weather reports in block 626 or maintenance schedules in block 628, or the process may be scheduled to run at regular intervals if the process is not started by either the event correlation process in blocks 622 and 624 or a human operator 633 within a certain interval.

In block 634 in FIG. 6C, if the link decision process by the link controller 318 determines that a link change is required, the link controller 318 may establish a new circuit or optical link in the optical network device 308 in block 636 and the lasercom relay platform 304 in block 638.

In block 640, a determination may be made by the link controller 318 if a ground station or node change is needed. If so, a new ground station or node circuit may be established by the link controller 318 in the optical network device 308 in block 642 and the lasercom relay platform 304 in block 644.

In block 646, a determination may be made whether there has been a relay platform change, ground station change or link change. If so, in block 650, the link controller 318 inserts forwarding table entries in the router 314 to direct traffic to the new circuit or link, and then tears down the old circuit or link in block 648. The link controller 318 updates the forwarding tables, block 650, on the router 314 to send packets over the newly established circuit, achieving hitless transmission of packets and any circuit emulation or pseudowire traffic the packets may be carrying.

Assuming the system 500 in FIG. 5, these circuit updates could be implemented for example as new satellites come into view above the horizon. This approach can be extended to other dynamic lasercom relay platform systems, such as UAVs and LEO satellites among others.

Figure 7:
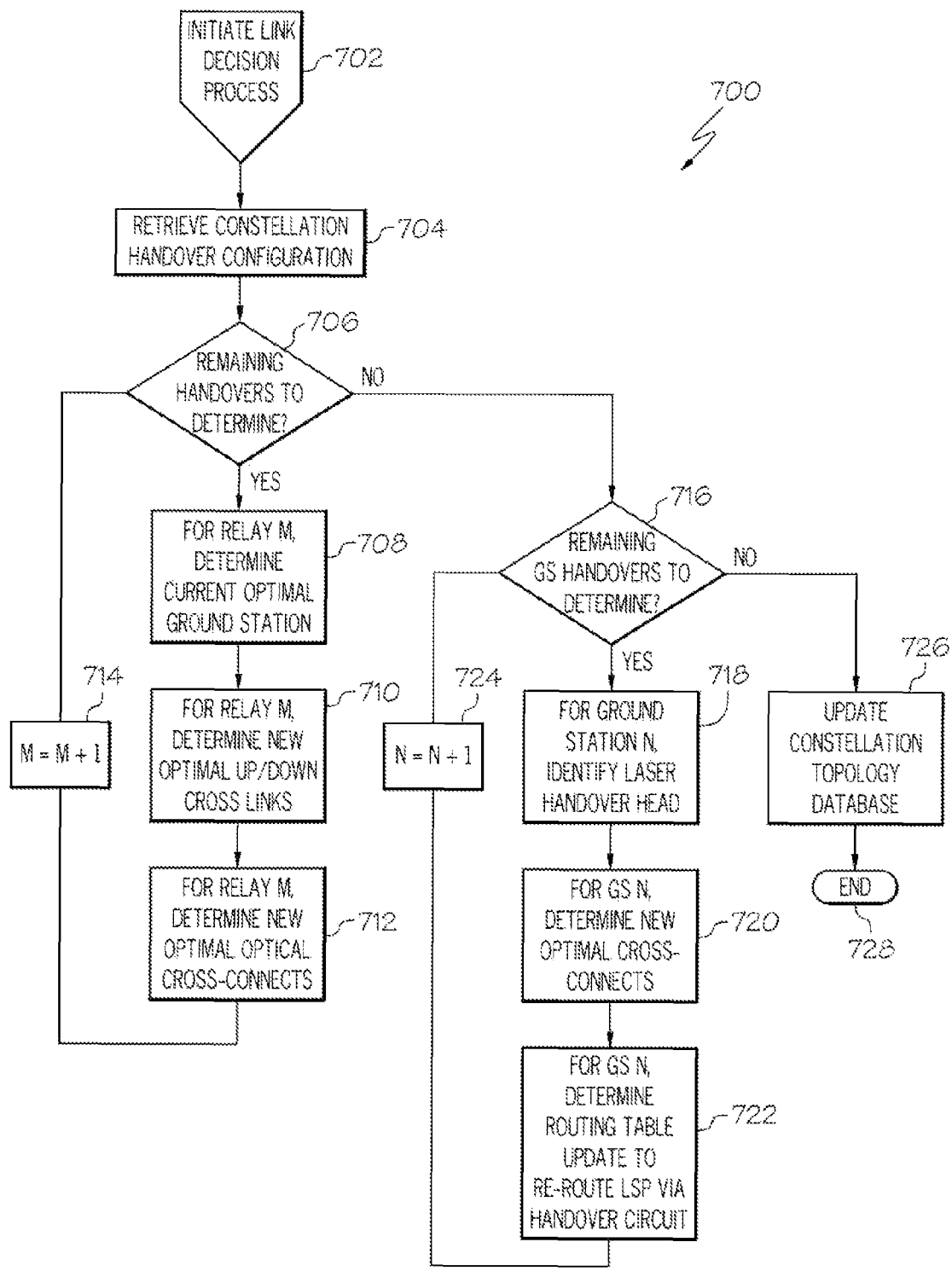
FIG. 7 is an example of a method of operation of a link controller for hitless transmission during communications link changes in accordance with an embodiment of the present disclosure.

FIG. 7 is an example of a method 700 of operation of a link controller for hitless transmission during communications link changes in accordance with an embodiment of the present disclosure. The method 700 may be used for or as part of the link decision process in block 632 of FIG. 6B. In block 702, the link decision process may be initiated. In block 704, a constellation handover configuration of the optical communications relay platforms may be retrieved from a database, such as event database 404 in FIG. 4 or another database associated with the system or network. The constellation handover configuration may include a current set of possible optical communications links between the ground stations and optical communications relay platforms or satellites and performance metrics associated with the links. Certain links may be preferred based on their associated performance metrics. Examples of performance metrics may include but are not necessarily limited to bit error rate, packet loss, jitter, received signal strength, total bandwidth, available bandwidth, and/or latency.

In block 706, a determination may be made whether there are remaining handovers to determine. If there are remaining handovers to be determined, the method 700 may advance to block 708. In block 708, for a particular optical communications relay platform, such as relay platform M, a current optimal ground station for optical communications with relay platform M may be determined. The current optimal ground station may be determined based on a combination of factors, such as for example current weather, terrestrial transport cost, traffic flow optimization, maintenance schedules and any other information that may be useful in selecting an optimal ground station for communications with the relay platform M.

In block 710, a new optimal communications link, uplink or up/down link between the ground station and the optical communications relay platform M may be determined. Optimal links may be selected based on one or a combination of several factors including weather and link parameters.

In block 712, any new optimal optical cross-connect changes to be implemented on relay platform M may be determined based on one or a combination of several factors including lasercom relay platform constellation configuration, available bandwidth and ground station availability.

In block 714, the relay platform index M is incremented and the method 700 returns to block 706. If there is another relay platform for handover processing, the loop of blocks 708-714 may be repeated. If there are no other relay platforms for handover processing, the method 700 may advance to block 716.

In block 716, a determination may be made if there are remaining ground stations for which handover may need to be processed or determined. If there are remaining ground stations for determining handover, the method 700 may advance to block 718. In block 718, for a particular ground station, such as ground station N, identified in the loop for relay platform M as being associated with relay platform M, a particular handover lasercom head of ground station N may be identified based on a variety of factors such as weather and offered traffic load.

In block 720, any optical cross-connect changes necessary to implement the selected uplink and/or cross links may be determined and implemented. In block 722, routing table updates that may be needed to actualize the new handover circuit in the ground station N may be determined and entered. Accordingly, the routing table may be updated to reroute via the new handover circuit.

In block 724, the ground station index N may be incremented and the method 700 may return to block 716. If there is another ground station for handover processing, the method 700 may loop back through the blocks 718-724. If there are no other ground stations for handover processing, the method 700 may advance to block 726. In block 726, the constellation topology database is updated with the new optical communications link and cross-link (relay link) or link circuits between the ground station N and relay platform M and between relay platform M and a next or successive relay platform M+1. The constellation topology database is separate from the handover configuration. The constellation topology database includes the actual set of network links constituting the topology of the system. The method 700 may end at termination 728.

The exemplary method 700 may determine the optimal ground station uplink to be implemented the next time a relay platform comes into view over the horizon. The method 700 may also be extended for use when a ground station optical communications link or uplink to the same relay platform needs to be changed in near real time in response to weather and/or other network traffic conditions. Additionally, as an alternative to establishing a complete end-to-end circuit prior to handover, communications traffic may be buffered at one or more ground stations until the circuit path change is complete.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for optical communications, comprising:
a multiplicity of optical communications relay platforms that each move relative to earth and above a surface of the earth, each optical communications relay platform comprising a relay link for communications between adjacent optical communications relay platforms;
a plurality of ground stations at different locations on the surface of the earth, wherein each ground station is configured to communicate with another of the ground stations through at least one of the multiplicity of optical communications relay platforms, each ground station comprising an optical communications link for optical communications with successive optical communications relay platforms, the optical communications link of each ground station being configured for handover connections between the successive optical communications relay platforms as the optical communications relay platforms move relative to the earth; and
a network operations center comprising a link controller, the link controller being configured to control switching of the optical communications links and the relay links for hitless transmission of optical communications signals, the link controller switching between a first optical communications link and a second optical communications link in response to at least degradation of the first optical communications link and the link controller switching between the relay links of successive optical communications relay platforms in response to at least movement of the optical communications relay platforms relative to the earth.

2. The system of claim 1, wherein the handover connection from the ground stations between successive optical communications relay platforms comprises a make before break connection.

3. The system of claim 1, wherein each of the multiplicity of optical communications relay platforms comprises a laser communications relay platform.

4. The system of claim 1, wherein each of the multiplicity of optical communications relay platforms comprises one of a low earth orbit satellite, a medium earth orbit satellite and an unmanned aerial vehicle.

5. The system of claim 1, further comprising a variable speed lambda network comprising a plurality of variable speed wavelength division multiplexing (WDM) lambdas, wherein the link controller is further configured to control functions comprising:
  admission of a variable speed WDM lambda to the variable speed lambda network, each variable speed WDM lambda having a tunable speed;
  modification of a speed of a particular variable speed WDM lambda; and
  optimization of bandwidth of the variable speed WDM lambdas.

6. The system of claim 5, wherein the variable speed lambda network further comprises:
  a provider optical add-drop multiplexer (ADM);
  a customer optical ADM, wherein the plurality of variable speed WDM lambdas provide communications between the provider optical ADM and the customer optical ADM; and
  a customer optical ring coupled to the customer optical ADM.

7. The system of claim 5, wherein the link controller comprises an algorithm configured to perform a method comprising:
  receiving a new request from a customer, the new request comprising one of a request for a new variable speed WDM lambda or a speed change request for an existing variable speed WDM lambda;
  retrieving an active topology map of the variable speed lambda network from a database;
  executing a multi-commodity network flow optimization based on the active topology map of the variable speed lambda network;
  configuring network elements to support the new request in response to the new request being admitted based on the multi-commodity network flow optimization, the network elements comprising a provider optical ADM and the plurality of variable WDM lambdas;
  updating bandwidth parameters of a link of the network topology graph associated with the customer; and
  notifying the customer that the new request has been granted and provisioned.

8. The system of claim 1, wherein the optical communications link comprises a laser communications uplink and each ground station further comprises:
  an optical switch for sending and receiving optical signals from the laser communications uplink;
  a router for sending and receiving the optical signals from the optical switch; and
  a sensor for detecting an environmental change, wherein the optical communications link is handed over to a next optical communications relay platform in response to the environmental change degrading communications between the ground station and a current optical communications relay platform below a predetermined link quality threshold.

9. The system of claim 1, wherein the network operations center further comprises:
  a network performance manager polling at least the plurality of ground stations for a change in quality of the optical communications link, and to poll at least one external sensor associated with each ground station for an environmental change, and the network performance manager further generating a threshold notification in response to at least one of the change in quality of the optical communications link exceeding a link quality threshold and the environmental change exceeding an environmental threshold;
  a database configured to receive an environmental change notification from the at least one external sensor in response to the environmental change, and to receive a link quality change notification from a particular ground station in response to the change in link quality of the optical communications link associated with the particular ground station, and to receive a notification in response to the network performance manager generating the threshold notification; and
  a correlation engine associated with the database, the correlation engine transmitting a signal to the link controller to initiate a link decision process for switching at least one of the optical communications links and the relay links in response to a correlation policy match based on at least one of the change in quality of the communications link, the environmental change and the threshold notification.

10. The system of claim 9, further comprising an out-of-band management network for communications between the network operations center and the ground stations.

11. A system for optical communications, comprising:
  a variable speed lambda network, the variable speed lambda network comprising:
    a provider optical add-drop multiplexer (ADM);
    a customer optical ADM;
    a plurality of variable speed wavelength division multiplexing (WDM) lambdas, each variable speed WDM lambda having tunable speed, wherein the plurality of variable speed WDM lambdas provide communications between the provider optical ADM and the customer optical ADM; and
  a link controller, wherein the link controller is configured to control functions comprising:
    admission of a variable speed WDM lambda to the variable speed lambda network;
    modification of a speed of a particular variable speed WDM lambda; and
    optimization of bandwidth of the variable speed WDM lambdas.

12. The system of claim 11, wherein the link controller comprises an algorithm configured to perform a method comprising:
  receiving a new request from a customer, the new request comprising one of a request for a new variable speed WDM lambda or a speed change request for an existing variable speed WDM lambda;
  retrieving an active topology map of the variable speed lambda network from a database;
  executing a multi-commodity network flow optimization based on the active topology map of the variable speed lambda network;
  configuring network elements to support the new request in response to the new request being admitted based on the multi-commodity network flow optimization, the network elements comprising a provider optical ADM, a customer optical ADM and the plurality of variable WDM lambdas;
updating bandwidth parameters of a link of the network topology graph associated with the customer; and
notifying the customer that the new request has been granted and provisioned.

13. The system of claim 11, further comprising:
a multiplicity of optical communications relay platforms that each move relative to earth and above a surface of the earth, each optical communications relay platform comprising a relay link for communications between adjacent optical communications relay platforms;
a plurality of ground stations at different locations on the surface of the earth, wherein each ground station is configured to communicate with another of the ground stations through at least one of the multiplicity of optical communications relay platforms, each ground station comprising an optical communications link for optical communications with successive optical communications relay platforms, the optical communications link of each ground station being configured for handover connections between the successive optical communications relay platforms as the optical communications relay platforms move relative to the earth; and
a network operations center comprising the link controller, the link controller being further configured to control switching of the optical communications links and the relay links for hitless transmission of communications signals.

14. The system of claim 13, wherein controlling switching by the link controller for hitless transmission of communications signals between the ground stations comprises:
implementation of the optical communications link of each ground station and the handover connection between the ground station and the successive optical communications relay platforms, and
implementation of the relay link between the successive optical communications relay platforms, the link controller switching between a first optical communications link and a second optical communications link in response to at least degradation of the first optical communications link and the link controller switching between the relay links of successive optical communications relay platforms in response to at least movement of the optical communications relay platforms relative to the earth.

15. The system of claim 13, wherein the optical communications link comprises a laser communications uplink and each ground station further comprises:
an optical switch for sending and receiving optical signals from the laser communications uplink;
a router for sending and receiving the optical signals from the optical switch; and
a sensor for detecting an environmental change, wherein the optical communications link is handed over to a next optical communications relay platform in response to the environmental change degrading communications between the ground station and a current optical communications relay platform below a predetermined link quality threshold.

16. The system of claim 13, wherein the network operations center further comprises:
a network performance manager polling at least the plurality of ground stations for a change in quality of the optical communications link, and polling at least one external sensor associated with each ground station for an environmental change, and the network performance manager further generating a threshold notification in response to at least one of the change in quality of the optical communications link exceeding a link quality threshold and the environmental change exceeding an environmental threshold;
a database configured to receive an environmental change notification from the at least one external sensor in response to the environmental change, and to receive a link quality change notification from a particular ground station in response to the change in link quality of the optical communications link associated with the particular ground station, and to receive a threshold notification in response to the network performance manager generating the threshold notification;
a correlation engine associated with the database, the correlation engine being configured to transmit a signal to the link controller to initiate a link decision process for switching at least one of the optical communications links and the relay links in response to a correlation policy match based on at least one of the change in quality of the communications link, the environmental change and the threshold notification.

17. A method for admission control and bandwidth optimization in a variable speed lambda network, comprising:
receiving, by a processor, a new request from a customer, the new request comprising one of a request for a new variable speed WDM lambda or a speed change request for an existing variable speed WDM lambda, each new variable speed WDM lambda and each existing variable speed WDM lambda having tunable speed;
retrieving, by the processor, an active topology map of the variable speed lambda network from a database;
executing, by the processor, a multi-commodity network flow optimization based on the active topology map of the variable speed lambda network;
configuring, by the processor, network elements to support the new request in response to the new request being admitted based on the multi-commodity network flow optimization, the network elements comprising a provider optical ADM, a customer optical ADM and the plurality of variable WDM lambdas;
updating, by the processor, bandwidth parameters of a link of the network topology graph associated with the customer; and
notifying, by the processor, the customer that the new request has been granted and provisioned.

18. A method for dynamically changing free space optical communications links for hitless transmission, the method comprising:
polling at least a ground station for a change in quality of an optical communications link from the ground station to an optical communications relay platform;
transmitting a link quality change notification from a ground station to a database in response to the change in quality of the optical communications link;
polling at least one external sensor associated with the ground station for an environmental change;
transmitting an environmental change notification from the at least one external sensor to the database in response to the environmental change;
generating a notification in response to at least one of the change in quality of the optical communications link exceeding a link quality threshold and the environmental change exceeding an environmental change threshold;
transmitting the threshold notification to the database; and switching at least one of the optical communications link and a relay link between the optical communications relay platform and a successive optical communications relay platform in response to at least one of the change in quality of the communications link, the environmental change and the threshold notification.

19. The method of claim 18, further comprising:

determining a correlation policy match based on at least one of the change in quality of the communications link, the environmental change and the threshold notification; and transmitting a signal to initiate a link decision process for switching the at least one of the optical communications link and the relay link in response to the correlation policy being matched.

20. The system of claim 1, wherein degradation is determined by polling parameters to detect that at least one performance indicator of a plurality of performance indicators has exceeded a preset threshold, the plurality of performance indicators comprising bit error rate, packet loss, jitter, signal strength, and latency.

* * * * *